No. 713,664. Patented Nov. 18, 1902.
J. W. MOORING.
SPRING TIRE FOR VEHICLE WHEELS.
(Application filed July 12, 1902.)
(No Model.)

WITNESSES:
INVENTOR
James William Mooring
ATTORNEY

THE NORRIS PETERS CO., PHOTO-LITHO., WASHINGTON, D. C.

UNITED STATES PATENT OFFICE.

JAMES WILLIAM MOORING, OF DUNSTABLE, ENGLAND.

SPRING-TIRE FOR VEHICLE-WHEELS.

SPECIFICATION forming part of Letters Patent No. 713,664, dated November 18, 1902.

Application filed July 12, 1902. Serial No. 115,381. (No model.)

*To all whom it may concern:*

Be it known that I, JAMES WILLIAM MOORING, lithographer, a subject of His Majesty the King of Great Britain and Ireland, residing at 4 Garden road, Dunstable, in the county of Bedford, England, have invented certain new and useful Improvements in or Relating to Spring-Tires for Cycles, Motor-Cars, and other Vehicles; and I do hereby declare the following to be a full, clear, and exact description of the invention, such as will enable others skilled in the art to which it appertains to make and use the same.

The object of the present invention is to provide a self-contained spring-tire suitable for cycles, motor-cars, and other vehicles and adapted for ready application to rims of existing patterns.

According to my invention the tire comprises an expansible and contractible band, preferably of spring-steel, provided with means whereby it may be tightened around the rim and locked in position thereon, an outer ring, which may be of wood and which provides or carries the tread of the tire, and a series of springs interposed between and connecting said outer ring or tread and the band applied to the rim. Those springs on the opposite side of the band to the tightening and locking device may be directly connected with said band, the latter being at this part but little affected by the expansion and contraction necessary to apply it to the rim; but since near the tightening and locking device there may be considerable movement of the band in a circumferential direction when it is expanded or contracted, which movement would be resisted by the springs if directly connected with the band, I prefer that the springs near such tightening and locking device should not be directly connected with the band, but so arranged as to permit the latter to move circumferentially independently of them. At the same time these springs will act to transmit the drive to the outer ring or tread, as if rigidly secured to the band, their inner ends being held against movement either in a circumferential or lateral direction relatively to the outer ring or tread and the band, so that all the springs will play their part in transmitting the drive.

In order that my invention may be fully understood, I will now describe the same with reference to the annexed drawings, in which similar letters refer to corresponding parts in all the figures, and wherein—

Figure 1:
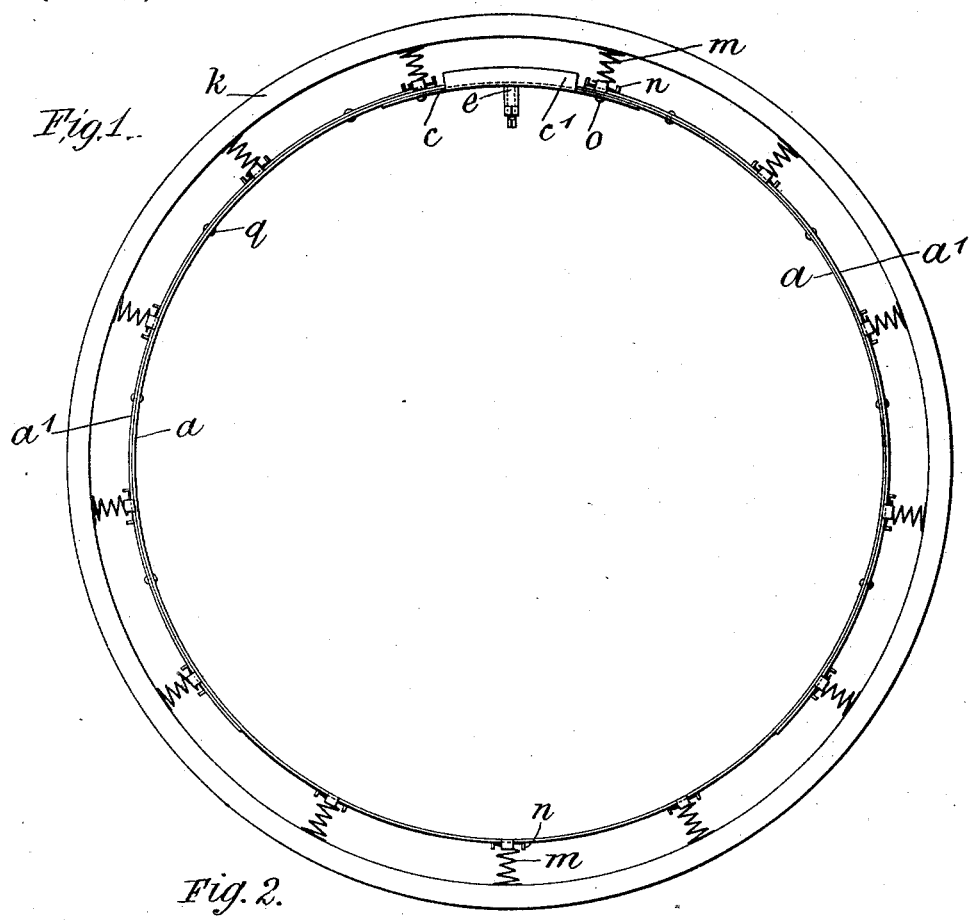
Figure 2:
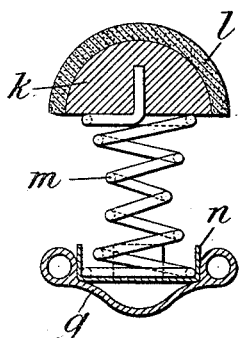
Figure 3:
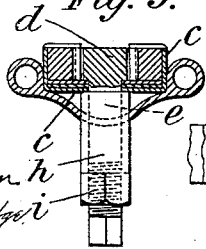
Figure 4:
Figure 5:
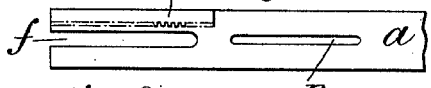
Figure 6:
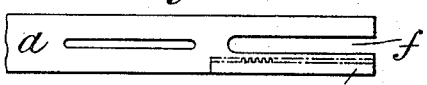
Figure 7:
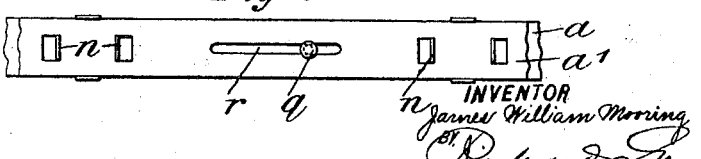

Figure 1 is a side elevation of a self-contained spring-tire constructed and arranged in accordance with my invention. Fig. 2 is a cross-section of the tire applied to a rim and drawn to a larger scale. Fig. 3 is a cross-section through the center of the tightening and locking device. Fig. 4 is a plan showing the tightening and locking device; and Figs. 5, 6, and 7 are details hereinafter referred to.

$a$ is a band of spring-steel whereof the overlapping ends are each provided with a rack $b$. These racks slide freely within channels $c'$, formed on opposite sides of a guide-plate $c$. Engaging with the teeth of both racks is a pinion $d$, carried by a stem $e$, which passes through the slots $f$ in the ends of the band $a$, through the guide-plate $c$, and through the ordinary valve-hole or a specially-provided hole in the rim $g$, to which the spring-tire is to be applied. An ordinary Westwood rim is here represented. The end of the stem $e$ is squared to receive a suitable key, whereby it may be turned to expand and contract the band to pass it over the rim and then tighten it around the same. $h$ is a sleeve or collar on the stem $e$, which also passes through the valve-hole in the rim and bears on the under side of guide-plate $c$, and $i$ a lock-nut which when tightened onto said sleeve or collar locks band $a$ in position.

$k$ is the outer ring or tread of the tire, which may be of wood and covered with rubber $l$ and which is connected with the band $a$ by the interposed springs $m$. These springs may be attached to the outer ring or tread by bending up their ends to provide spikes which enter holes in said outer ring, Fig. 2, and the inner ends of the springs may be held in sockets provided by bending up lugs $n$ from the band $a$ or from the bands $a'$, overlying and slidable relatively to the latter and about to be described. It will be seen that the three springs $m$ opposite to the tightening and locking device of the band $a$ are directly connected with or held by said band, while the remaining springs are connected with or held by bands $a'$, overlying the band $a$ and attached at their ends to the guide-plate $c$ by the studs or rivets $o$, which pass through slots $p$ in the band $a$, Fig. 4. The bands $a'$ are held in place on band $a$ by means of the studs $q$, extending from the latter through the slots $r$ in the bands $a'$, Fig. 7. The band $a$ can thus slide relatively to the bands $a'$, while the latter, being secured at their ends to the tightening and locking device, preserve a fixed position relatively to the outer ring or tread $k$. The band $a$, being thus movable in a circumferential direction independently of the springs $m$ near the tightening device, may readily be expanded and contracted, and when fixed in position on the rim all the springs will take part in transmitting the drive to the outer ring or tread $k$. The rubber tread $l$ may extend inward from each side of outer ring $k$ and be secured beneath band $a$ to conceal the springs and give a neater appearance.

What I claim, and desire to secure by Letters Patent of the United States, is—

1. A self-contained spring-tire comprising an expansible and contractible band, means for tightening and locking the same around a rim, an outer ring or tread and springs interposed between the latter and the band, said band being movable circumferentially for expansion and contraction independently of the springs near the tightening and locking device, substantially as described.

2. A self-contained spring-tire comprising an expansible and contractible band, means for tightening and locking the same around a rim, an outer ring or tread and springs interposed between the latter and the band, the inner ends of the springs near the tightening and locking device being carried by bands which overlie the band aforesaid and are slidable relatively thereto but which preserve a fixed position relatively to the outer ring or tread, substantially as described.

3. In a self contained spring-tire, the combination of the band $a$, the racks $b$ on the ends thereof sliding in channels formed on a guide-plate $c$, the pinion $d$ meshing with the racks, the means for turning and locking said pinion, the bands $a'$ attached at their ends to the guide-plate $c$ and overlying and slidable relatively to the band $a$, the outer ring or tread $k$ and the springs $m$ between the latter and the band $a$, the springs opposite the junction of the latter being directly connected with band $a$ while those nearer the tightening and locking means are connected with the overlying bands $a'$, substantially as described.

In testimony whereof I affix my signature in the presence of two witnesses.

JAMES WILLIAM MOORING.

Witnesses:
ARTHUR CHAPMAN,
JAMES FIELD.